United States Patent
Sugo et al.

(10) Patent No.: US 6,538,093 B2
(45) Date of Patent: Mar. 25, 2003

(54) POLYIMIDE SILICONE RESIN, PROCESS FOR ITS PRODUCTION, AND POLYIMIDE SILICONE RESIN COMPOSITION

(75) Inventors: Michihiro Sugo, Annaka (JP); Hideto Kato, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/892,444

(22) Filed: Jun. 28, 2001

(65) Prior Publication Data

US 2002/0016438 A1 Feb. 7, 2002

(30) Foreign Application Priority Data

Jun. 29, 2000 (JP) ........................................ 2000-196842

(51) Int. Cl.$^7$ .............................................. C08G 77/26

(52) U.S. Cl. ........................... 528/28; 528/38; 525/431; 427/387; 428/447

(58) Field of Search ..................... 528/28, 38; 525/431; 428/447; 427/387

(56) References Cited

U.S. PATENT DOCUMENTS

| | | | | |
|---|---|---|---|---|
| 5,094,919 A | * | 3/1992 | Yamada et al. | 428/450 |
| 5,209,981 A | * | 5/1993 | Rojstaczer | 428/447 |
| 5,693,735 A | | 12/1997 | Sugo et al. | |
| 5,852,153 A | | 12/1998 | Sugo et al. | |
| 6,143,423 A | * | 11/2000 | Shiobara et al. | 428/620 |
| 6,297,341 B1 | * | 10/2001 | Ueki et al. | 528/26 |

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A polyimide silicone resin which contains not more than 300 ppm of a cyclic siloxane oligomer having 10 or less silicon atoms, has a glass transition point of 250° C. or below and is soluble in an organic solvent. This polyimide silicone resin is produced using a diamine containing a diaminosiloxane containing not more than 300 ppm of the cyclic siloxane oligomer. Also disclosed is a polyimide silicone resin composition including 50 to 99% by mass of the polyimide silicone resin and 1 to 50% by mass of an epoxy compound. The polyimide silicone resin has been made to less contain the cyclic siloxane oligomers causative of trouble in electrical contacts, and promises a good adhesiveness or bond strength to substrates and a high reliability.

14 Claims, No Drawings

POLYIMIDE SILICONE RESIN, PROCESS FOR ITS PRODUCTION, AND POLYIMIDE SILICONE RESIN COMPOSITION

BACKGROUND OF THE INVENTION

1. Field of the Invention

This invention relates to a polyimide silicone resin especially less containing volatile cyclic siloxane oligomers, a process for its production, and a polyimide silicone resin composition comprised of it as an effective component and having a good adhesiveness (bond strength).

2. Description of the Prior Art

Polyimide resins are commonly used as materials for printed circuit boards and heat-resistant adhesive tapes because of their high heat resistance and superior electrical insulation properties. Although the polyimide resins are used as resin varnish to form surface protective films and interlayer insulating films of electronic parts and semiconductor materials, they are capable of dissolving only in limited solvents. Accordingly, a method is commonly employed in which a solution prepared by dissolving in an organic solvent a polyimide precursor polyamic acid capable of relatively readily dissolving in various organic solvents is coated on a substrate, followed by removal of the solvent and then high-temperature treatment to effect dehydration cyclization and the product obtained is used as polyimide resin. Also, in order to, e.g., improve the solubility of polyimide resin in solvents, improve its adhesive force to substrates and impart flexibility, it is popular to introduce a siloxane chain into the polyimide skeleton. Siloxane materials widely used to introduce a siloxane chain into the polyimide skeleton are diaminosiloxanes, i.e., straight-chain silicones having amino groups at both terminals.

However, diaminosiloxanes which are commonly available contain cyclic siloxanes as impurities. Some cyclic siloxanes are volatile, and such volatile siloxanes are known to cause trouble in electrical contacts of relays, switches, motors and so forth used in electronic and electrical equipment. Also, as is seen from the fact that siloxanes are used as release agents (parting agents), they have had a problem that the presence of cyclic siloxanes in polyimide silicones may lower the adhesiveness or bond strength to substrates.

Meanwhile, electronic and electrical equipment or semiconductor chips are increasingly made compact or made high-performance. Accordingly, it is long-awaited to provide a polyimide silicone resin or polyimide silicone resin composition having a high reliability and a high adhesiveness.

SUMMARY OF THE INVENTION

Under such circumstances, an object of the present invention is to provide a polyimide silicone resin made to less contain the cyclic siloxane oligomers causative of the trouble in electrical contacts, a process for its production, and a polyimide silicone resin composition comprised of such a resin as an effective component and showing a good adhesiveness (bond strength) to substrates and a high reliability.

As a result of extensive studies made in order to solve the problems discussed above, the present inventors have discovered that a polyimide silicone resin less containing cyclic siloxane oligomers and having a relatively low glass transition point and a composition containing this resin as an effective component can solve the problems. They have also discovered that the polyimide silicone resin less containing cyclic siloxane oligomers can be obtained by using as a diamine component a diaminosiloxane less containing cyclic siloxane oligomers. Thus, they have accomplished the present invention.

More specifically, the present invention in the first aspect provides a polyimide silicone resin which contains not more than 300 ppm of a cyclic siloxane oligomer having 10 or less silicon atoms, has a glass transition point of 250° C. or below and is soluble in an organic solvent.

The present invention in the second aspect provides a process for producing a polyimide silicone resin from a tetracarboxylic dianhydride and a diamine, wherein the diamine contains a diaminosiloxane represented by the following general formula (10), and the diaminosiloxane contains not more than 300 ppm of a cyclic siloxane oligomer having 10 or less silicon atoms.

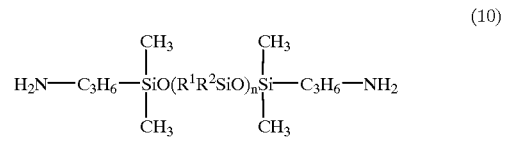

wherein n represents an integer of from 0 to 120, and $R^1$ and $R^2$ each represent an alkyl group having 1 to 8 carbon atoms or a phenyl group.

The present invention also in the third aspect provides a polyimide silicone resin composition comprising from 50% by mass to 99% by mass of the above polyimide silicone resin and from 1% by mass to 50% by mass of an epoxy compound.

DESCRIPTION OF THE PREFERRED EMBODIMENTS

The present invention will be described below in detail.

In the polyimide silicone resin of the present invention, a cyclic siloxane oligomer having 10 or less silicon atoms is kept in a small content.

In the present invention, the cyclic siloxane oligomer having 10 or less silicon atoms may include, for example, compounds represented by the following general formula:

$(R^3R^4SiO)_m$ wherein $R^3$ and $R^4$ may be the same or different and each represent an alkyl group having 1 to 8 carbon atoms or a phenyl group, the alkyl group including e.g., a methyl group, an ethyl group or a propyl group; and m is an integer of 3 to 10; and may specifically include hexamethylcyclotrisiloxane and octamethylcyclotrisiloxane. Any of these cyclic siloxane oligomer in the polyimide silicone resin must be in a content not more than 300 ppm in order to materialize a high reliability and a high adhesive performance. It may more preferably be in a content of 100 ppm or less.

The polyimide silicone resin of the present invention may also preferably have not so high glass transition point in order to materialize a good adhesiveness or bond strength. It may have a glass transition point of 250° C. or below, and more preferably from 50° C. to 200° C.

When the polyimide silicone resin of the present invention is used as a component of adhesives, it is dissolved in an organic solvent to prepare them, and hence must be soluble in the organic solvent.

The organic solvent used here may include polar solvents such as N-methyl-2-pyrrolidone, cyclohexanone, N,N-dimethylformamide and N,N-dimethylacetamide, ketone type solvents such as 2-butanone and 4-methyl-2-pentanone, and ether type solvents such as tetrahydrofuran and propylene glycol dimethyl ether.

As methods for making the content of the cyclic siloxane oligomer small in the polyimide silicone resin, known methods may be used, which may include, e.g., a method in which the polyimide silicone resin is once dissolved in a solvent and thereafter re-precipitated to take out the polyimide silicone resin to bring the cyclic siloxane oligomer into a small content, and a method in which a siloxane originally having the cyclic siloxane oligomer in a small content is used as a material. In particular, the method in which a siloxane originally having the cyclic siloxane oligomer in a small content is used as a material is desirable from the viewpoint of saving of natural resources and power saving.

As this siloxane material, it is preferable to use the diaminosiloxane represented by the general formula (10). In this diaminosiloxane, the cyclic siloxane oligomer may preferably be in a content not more than 300 ppm, and more preferably not more than 100 ppm. As methods for making the content of the cyclic siloxane oligomer small in the diaminosiloxane, known methods may be used, which may include, e.g., methods such as striping at high temperature and extraction making use of a solvent. In the general formula (10), n represents an integer of from 0 to 120, and $R^1$ and $R^2$ each represent an alkyl group having 1 to 8 carbon atoms or a phenyl group.

As the above polyimide silicone resin, it is preferable to use a polyimide silicone resin having repeating units represented by the following general formulas (a) and (b).

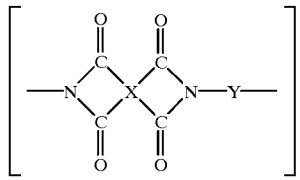

(a)

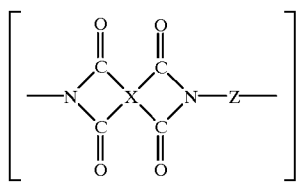

(b)

In the formulas;

X is at least one organic group selected from tetravalent organic groups represented by the formulas (1), (2) and (3):

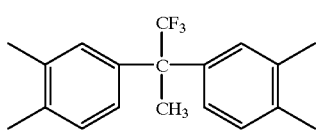

(1)

-continued

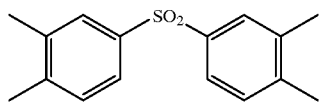

(2)

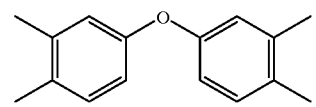

(3)

Y is an organic group selected from i) a divalent organic group represented by the general formula (4):

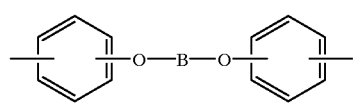

(4)

where B is at least one organic group selected from organic groups represented by the formulas (5), (6) and (7):

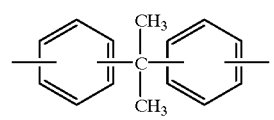

(5)

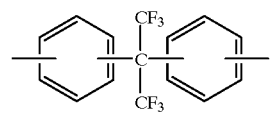

(6)

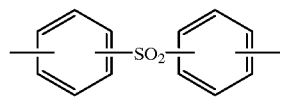

(7)

and ii) a divalent organic group represented by the general formula (8):

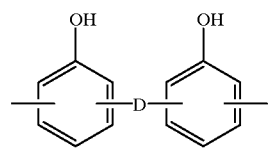

(8)

where D is at least one organic group selected from a single bond, —$CH_2$—, —$(CH_3)_2C$—, —$SO_2$— and —$(CF_3)_2C$—; and Z is a divalent siloxane residual group represented by the general formula (9):

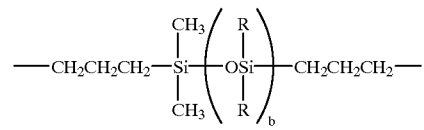

(9)

where R is a methyl group or a phenyl group, and b is an integer of 0 to 120.

The polyimide silicone resin is produced by a known process and from a tetracarboxylic dianhydride and a diamine containing the diaminosiloxane represented by the general formula (10). The diaminosiloxane represented by the general formula (10) may be used in an amount of from 5 to 75 mol %, and preferably from 10 to 50 mol %, of the total diamine. Also, as a diamine other than the diaminosiloxane represented by the general formula (10), it may preferably include a diamine which provides residual groups exemplified as the groups of the above general formulas (4) and (8).

A preferred process for producing the polyimide silicone resin is described below.

For example, at least one tetracarboxylic dianhydride selected from 2,2-bis-(3,4-benzenedicarboxylic anhydride) perfluoropropane, represented by the formula (11), and bis-(3,4-dicarboxyphenyl)-sulfone dianhydride, represented by the formula (12):

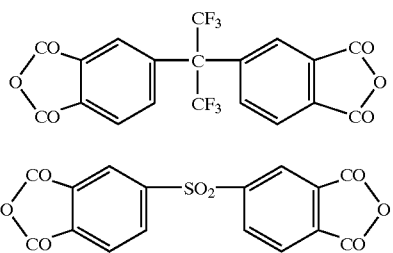

at least one hydroxyl-group-containing aromatic diamine selected from aromatic diamines having phenolic hydroxyl groups represented by the formulas (13), (14) and (15):

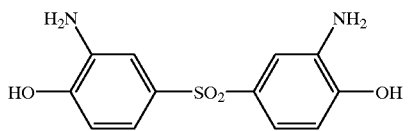

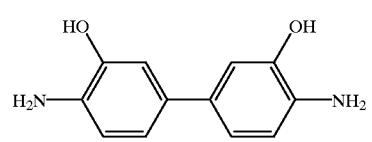

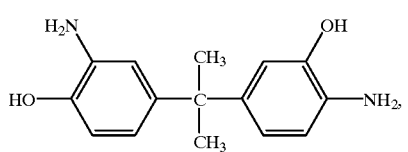

at least one diamine component selected from an aromatic diamine represented by the formula (16), a fluorine-containing aromatic diamine represented by the formula (17) and an aromatic diamine represented by the formula (18):

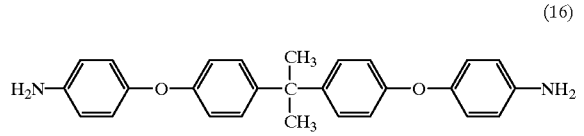

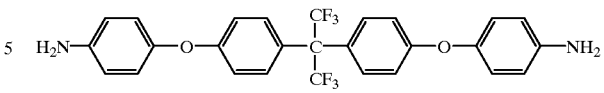

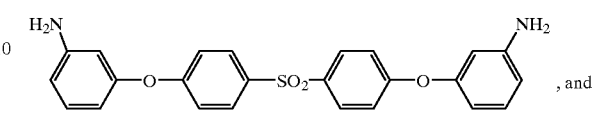

at least one diaminosiloxane represented by said general formula (10) wherein n is an integer of 0 to 120, and $R^1$ and $R^2$ each represent an alkyl group with 1 to 8 carbon atoms or a phenyl group, are charged into a solvent such as cyclohexanone to allow them to react at a low temperature, i.e., about 20 to 50° C. to synthesize polyamic acid silicone which is a precursor of the polyimide silicone resin.

Here, the proportion of the diamine component to the tetracarboxylic dianhydride component may appropriately be determined in accordance with, e.g., the modifying of molecular weight of the polyimide silicone resin, and may usually be in the range of from 0.95 to 1.05, and preferably from 0.98 to 1.02, in molar ratio. To modify the molecular weight of the polyimide silicone resin, a monofunctional material such as phthalic anhydride or aniline may be added. In such a case, the material may preferably be added in an amount of 2 mol % or less based on the weight of the polyimide silicone resin.

Subsequently, the resultant polyamic acid silicone solution is heated to a temperature usually in the range of from 80 to 200° C., and preferably from 140 to 180° C., to cause the acid amide moiety of the polyamic acid silicone to undergo dehydration cyclization reaction to obtain the polyimide silicone resin in the form of a solution. Another method is also available in which an acetic anhydride/pyridine mixture solution is added to the polyamic acid silicone solution and then the resultant solution is heated to about 50° C. to effect imidization.

The polyimide silicone resin composition of the present invention is comprised of i) the polyimide silicone resin which contains not more than 300 ppm of the cyclic siloxane oligomer having 10 or less silicon atoms, has a glass transition point of 250° C. or below and is soluble in an organic solvent, and ii) 1 to 50% by mass of an epoxy compound mixed in 50 to 99% by mass of the former. If the epoxy compound is mixed in an amount more than 50% by mass, the features of polyimide silicone may be damaged. A catalyst may also be added in order to accelerate the reaction of the epoxy compound. As the catalyst, usable are known catalysts such as imidazoles, amines and acid anhydrides. Also, as the epoxy compound, any known epoxy resin may be used. For example, the epoxy resin may include, as effective ones, bifunctional epoxy compounds such as bisphenol-A types and bisphenol-F types, and besides polyfunctional epoxy compounds having three or more functional groups.

The polyimide silicone resin of the present invention, unlike the polyamic acid type, does not require any long-time heating at such a high temperature of 250° C. or above for its imidization. Also, since this polyimide silicone resin has been made to less contain the volatile cyclic siloxane oligomers which may lower adhesiveness and are causative of the trouble in electrical contacts, it is suited for uses where a high reliability is required, such as electronic and electrical equipment or semiconductor chips, and is suitable as, e.g., adhesives or coating materials for devices. The polyimide silicone resin composition having this polyimide silicone resin as an effective component also has a good adhesiveness or bond strength to substrates, and is suitable as adhesives or coating materials. Moreover, the polyimide silicone resin or the polyimide silicone resin composition can be made into films by coating on substrates the resin or composition dissolved in a solvent, evaporating the solvent off and peeling the coatings formed. Accordingly, it can also be used as film-type adhesives having heat resistance.

EXAMPLES

The present invention is described below in greater detail by giving Examples. The present invention is by no means limited to these Examples. In the following, compounds shown below are abbreviated as shown below. 3,3', 4,4'-Diphenylsulfone tetracarboxylic dianhydride: DSDA 4,4'-Hexafluoropropylidenebisphthalic dianhydride: 6FDA 2,2-Bis[4-(4-aminophenoxy)phenyl]propane: BAPP 3,3'-dihydroxy-4,4'-diaminobiphenyl: HAB

PURIFICATION EXAMPLE 1

(Purification of diaminosiloxane made to less contain volatile cyclic siloxane oligomer)

500 g of unpurified dimethylpolysiloxane having amino groups at both terminals (hereinafter "unpurified diaminodimethylpolysiloxane"), represented by the following formula (19), was put in a flask to carry out stripping at 250° C./1,330 Pa for 2 hours while blowing nitrogen gas into it.

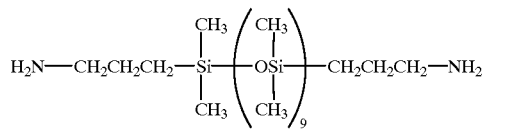

(19)

The oil thus obtained had a viscosity of 16 mm²/s, an amine equivalent weight of 650 g/mol, where the total sum of cyclic siloxane oligomers $[(CH_3)_2SiO]_n$ (n=3 to 10) which was 3,300 ppm before the stripping was brought down to 80 ppm. The dimethylpolysiloxane (having amino groups at both terminals) obtained after this stripping is designated as diaminosiloxane (a).

SYNTHESIS EXAMPLE 1

Synthesis of Polyimide Silicone

Into a flask having a stirrer, a thermometer and a nitrogen displacement unit, 119.3 g (0.33 mol) of DSDA and 400 g of cyclohexanone were charged. Then, a solution prepared by dissolving 87.0 g (0.07 mol) of the above unpurified diaminodimethylpolysiloxane, 29.1 g (0.133 mol) of HAB and 41.4 g (0.10 mol) of BAPP in 100 g of cyclohexanone was dropwise added into the flask while the temperature of the reaction system was so controlled as not to become higher than 50° C. After their addition, the mixture formed was further stirred at room temperature for 10 hours.

Next, a reflux condenser having a water-receiving container was attached to the flask, and thereafter 60 g of toluene was added, followed by heating to 150° C. This temperature was kept for 6 hours, whereupon a yellowish brown solution was obtained. The solvent in the solution thus obtained was evaporated off, followed by drying under reduced pressure to obtain a polyimide silicone resin.

Infrared light absorption spectra of the resin obtained were measured, where any absorption due to polyamic acid silicone showing the presence of unreacted functional groups did not appear, and absorption due to imide groups was seen at 1,780 cm$^{-1}$ and 1,720 cm$^{-1}$. Weight-average molecular weight (in terms of polystyrene) of the resin was measured by gel permeation chromatography (GPC) using tetrahydrofuran as a solvent to find that it was 35,000. Its glass transition point measured by differential thermal analysis was 190° C. The content of cyclic siloxane oligomers in the present resin was measured by gas chromatography (GC) to find that the total sum of $[(CH_3)_2SiO]_n$ (n=3 to 10) was 850 ppm. This resin was designated as polyimide silicone resin (I), and was used in Comparative Example.

PURIFICATION EXAMPLE 2

To Lessen Cyclic Siloxane Oligomers

The polyimide silicone resin (I) obtained in Synthesis Example 1 was poured into 300 g of 2-butanone and was uniformly dissolved therein. The resultant solution was slowly poured into methanol with stirring to effect reprecipitation to obtain a polyimide silicone resin. This reprecipitation was repeated three times in total, followed by drying to obtain a purified polyimide silicone resin. The content of cyclic siloxane oligomers in the present resin was measured by gas chromatography (GC) to find that the total sum of $[(CH_3)_2SiO]_n$ (n=3 to 10) was 80 ppm. This resin was designated as polyimide silicone resin (I), and was used in Examples.

SYNTHESIS EXAMPLE 2

Synthesis of Polyimide Silicone

Into a flask having a stirrer, a thermometer and a nitrogen displacement unit, 119.3 g (0.33 mol) of 6FDA and 400 g of cyclohexanone were charged. Then, a solution prepared by dissolving 107.9 g (0.083 mol) of the diaminosiloxane (a), obtained by the purification in Purification Example 1, 4.1 g (0.0167 mol) of 1,3-bis(3-aminopropyl) tetramethyldisiloxane, 29.1 g (0.133 mol) of HAB and 41.1 g (0.10 mol) of BAPP in 100 g of cyclohexanone was dropwise added into the flask while the temperature of the reaction system was so controlled as not to become higher than 50° C. After their addition, the mixture formed was further stirred at room temperature for 10 hours.

Next, a reflux condenser having a water-receiving container was attached to the flask, and thereafter 60 g of toluene was added, followed by heating to 150° C. This temperature was kept for 6 hours, whereupon a yellowish brown solution was obtained. The solvent in the solution thus obtained was evaporated off, followed by drying under reduced pressure to obtain a polyimide silicone resin.

Infrared light absorption spectra of the resin obtained were measured, where any absorption due to polyamic acid silicone showing the presence of unreacted functional groups did not appear, and absorption due to imide groups was seen at 1,780 cm$^{-1}$ and 1,720 cm$^{-1}$. Weight-average molecular weight (in terms of polystyrene) of the resin was measured by gel permeation chromatography (GPC) using tetrahydrofuran as a solvent to find that it was 40,000. Its glass transition point measured by differential thermal analysis was 150° C. The content of cyclic siloxane oligomers in the present resin was measured by gas chromatography (GC) to find that the total sum of $[(CH_3)_2SiO]_n$ (n=3 to 10) was 20 ppm. This resin was designated as polyimide silicone resin (III), and was used in Examples.

SYNTHESIS EXAMPLE 3

Synthesis of Polyimide Silicone

Into a flask having a stirrer, a thermometer and a nitrogen displacement unit, 119.3 g (0.33 mol) of 6FDA and 400 g of cyclohexanone were charged. Then, a solution prepared by dissolving 116.0 g (0.133 mol) of the above unpurified diaminodimethylpolysiloxane, 29.1 g (0.133 mol) of HAB and 27.4 g (0.067 mol) of BAPP in 100 g of cyclohexanone was dropwise added into the flask while the temperature of the reaction system was so controlled as not to become higher than 50° C. After their addition, the mixture formed was further stirred at room temperature for 10 hours.

Next, a reflux condenser having a water-receiving container was attached to the flask, and thereafter 60 g of toluene was added, followed by heating to 150° C. This temperature was kept for 6 hours, whereupon a yellowish brown solution was obtained. The solvent in the solution thus obtained was evaporated off, followed by drying under reduced pressure to obtain a polyimide silicone resin.

Infrared light absorption spectra of the resin obtained were measured, where any absorption due to polyamic acid silicone showing the presence of unreacted functional groups did not appear, and absorption due to imide groups was seen at 1,780 cm$^{-1}$ and 1,720 cm$^{-1}$. Weight-average molecular weight (in terms of polystyrene) of the resin was measured by gel permeation chromatography (GPC) using tetrahydrofuran as a solvent to find that it was 32,000. Its glass transition point measured by differential thermal analysis was 140° C. The content of cyclic siloxane oligomers in the present resin was measured by gas chromatography (GC) to find that the total sum of $[(CH_3)_2SiO]_n$ (n =3 to 10) was 1,050 ppm. This resin was designated as polyimide silicone resin (IV), and was used in Comparative Example.

EXAMPLES 1 TO 4 & COMPARATIVE EXAMPLES 1 TO 3

Preparation of Heat-resistant Adhesives:

In each Example and Comparative Example, the polyimide silicone resin, epoxy resin, catalyst (curing agent) and solvent were mixed in the types and proportion as shown in Table 1 to prepare heat-resistant adhesives.

TABLE 1

Preparation of Heat-resistant Adhesives

| | Formulation | | | | | | | | | |
|---|---|---|---|---|---|---|---|---|---|---|
| | Polyimide silicone resin | Parts by mass | Epoxy resin | Parts by mass | Solvent | Parts by mass | Catalyst | Part by mass |
| Example 1 | II | 100 | K | 20 | 2-butanone | 200 | 2-ethyl imidazole | 0.1 |
| Example 2 | II | 100 | K | 60 | 2-butanone | 200 | 2-ethyl imidazole | 0.2 |
| Example 3 | II | 100 | L | 20 | cyclohexanone | 200 | 2-ethyl imidazole | 0.1 |
| Example 4 | III | 100 | K | 30 | cyclohexanone | 200 | 2-phenyl-4,5-dihydroxymethylimidazole | 0.1 |
| Example 5 | III | 100 | M | 30 | cyclohexanone | 200 | none | |
| Comparative Example 1 | I | 100 | K | 20 | 2-butanone | 200 | 2-ethyl imidazole | 0.1 |
| Comparative Example 2 | IV | 100 | K | 30 | cyclohexanone | 200 | 2-ethyl imidazole | 0.1 |
| Comparative Example 3 | II | 100 | none | | 2-butanone | 200 | none | |

Epoxy resin K: EPIKOTE 825 (trade name: available from Yuka Shell Epoxy Kabushikikaisha)
Epoxy resin L: EPIKOTE 801P (trade name: available from Yuka Shell Epoxy Kabushikikaisha)
Epoxy resin M: EPIKOTE 152 (trade name: available from Yuka Shell Epoxy Kabushikikaisha)

Performance evaluation of heat-resistant adhesives:

Tensile Shear Strength

Two oblong test pieces were made ready for use. The heat-resistant adhesives thus prepared were each coated on one test piece at its one-side end portion, and then the solvent was evaporated at 50° C. over a period of 30 minutes and further at 105° C. over a period of 30 minutes. Thereafter, one-side end portion of the other test piece was put upon the former's part where the heat-resistant adhesive was coated, in such a way that the adhesive-free end portions of the both test pieces lay at both ends after their bonding, followed by contact bonding under conditions of 180° C. and 3 MPa for 2 minutes to bond them. Thus, test pieces for a tensile shear strength test were prepared. Using Autograph (manufactured by Shimadzu Corporation), the adhesive-free end portions of the bonded test piece were pulled in opposite directions at a rate of 50 mm/minute to measure tensile shear strength. Results obtained are shown in Table 2 below.

TABLE 2

Tensile Shear Strength (MPa)

| | Substrate | |
|---|---|---|
| | Copper | Aluminum |
| Example 1 | 3.8 | 4.2 |
| Example 2 | 5 | 5.2 |
| Example 3 | 3.3 | 3.9 |
| Example 4 | 3.2 | 3.8 |
| Example 5 | 3.4 | 3.5 |
| Compara-tive Example 1 | 2.5 | 3.1 |
| Compara-tive Example 2 | 2.2 | 2.9 |
| Compara-tive Example 3 | 0.1 | 0.3 |

As described above, the polyimide silicone resin of the present invention has superior heat resistance and has been made to less contain the cyclic siloxane oligomers having 10 or less silicon atoms, causative of the trouble in electrical contacts. Hence, it has a good adhesiveness or bond strength to substrates and a high reliability and also can make the trouble in electrical contacts less occur. Thus, it can be useful in the bonding and protection of highly reliable electronic parts and semiconductor devices and also effective as interlayer adhesives and conformal-coating materials of printed circuit boards and so forth. Also, the production process of the present invention enables manufacture of such polyimide silicone resin with ease. In addition, the resin composition of the present invention, having this polyimide silicone resin as an effective component, also has the above properties and is preferably usable as an adhesive material or a coating material.

What is claimed is:

1. A polyimide silicone resin which contains not more than 300 ppm of a cyclic siloxane oligomer having 10 or less silicon atoms, has a glass transition point of 250° C. or below and is soluble in an organic solvent.

2. The polyimide silicone resin according to claim 1, wherein the cyclic siloxane oligomer comprises a compound represented by the following general formula:

(R³R⁴Sio)

wherein $R^3$ and $R^4$ are the same or different and each represent an alkyl group having 1 to 8 carbon atoms or a phenyl group, and m is an integer of 3 to 10.

3. The polyimide silicone resin according to claim 1, wherein the cyclic siloxane oligomer is present in an amount of 100 ppm or less.

4. The polyimide silicone resin according to claim 1, wherein said glass transition point ranges from 50° C. to 200° C.

5. The polyimide silicone resin according to claim 1, wherein said organic solvent is selected from the group consisting of polar solvents, ketone solvents, and ether solvents.

6. The polyimide silicone resin according to claim 1, which comprises a repeating unit represented by the general formula (a) and a repeating unit represented by the general formula (b):

(a)
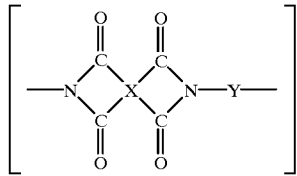

(b)
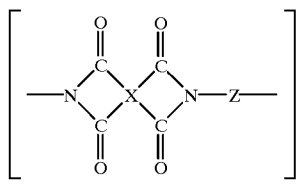

wherein X is at least one organic group selected from the group consisting of the tetravalent organic groups represented by the formulas (1), (2) and (3):

(1)
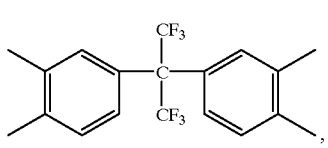

-continued (2)
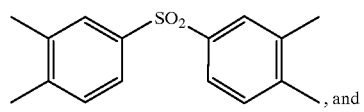
, and (3)
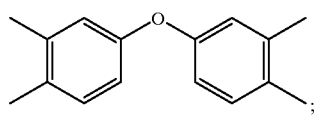
;

Y is a divalent organic group selected from the group consisting of i) a divalent organic group represented by the general formula (4):

(4)
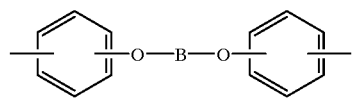

where B is at least one organic group selected from the group consisting of the organic groups represented by the formulas (5), (6) and (7):

(5)
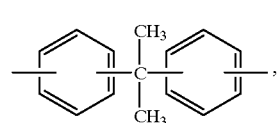
, (6)
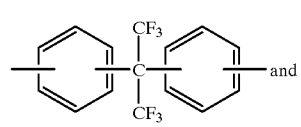
and (7)
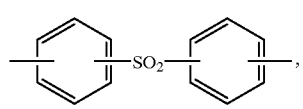
, and ii) a divalent organic group represented by the general formula (8):

(8)
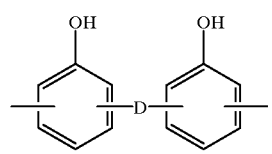

where D is at least one member selected from the group consisting of a single bond, —CH₂—, —(CH₃)₂C—, —SO₂— and —(CF₃)₂C—; and Z is a divalent siloxane residual group represented by the general formula (9):

(9)
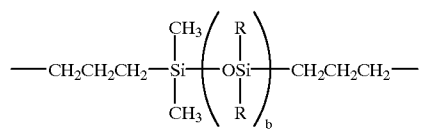

where R is a methyl group or a phenyl group, and b is an integer of 0 to 120.

7. A process for producing a polyimide silicone resin according to claim 1 from a tetracarboxylic dianhydride and a diamine, wherein the diamine comprises a diaminosiloxane represented by the following general formula (10), and the diaminosiloxane contains not more than 300 ppm of a cyclic siloxane oligomer having 10 or less silicon atoms.

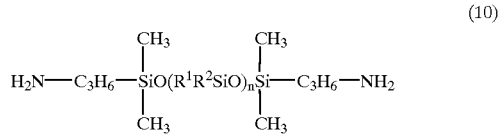

(10)

wherein n represents an integer of from 0 to 120, and $R^1$ and $R^2$ each represent an alkyl group having 1 to 8 carbon atoms or a phenyl group.

8. The process according to claim 7, wherein the diaminosiloxane represented by the general formula (10) is present in an amount of from 5 to 75 mol % of the total diamine.

9. A method comprising adhering or coating a substrate with a polyimide silicone resin according to claim 1 as an adhesive or coating material.

10. A product obtained by the method of claim 9.

11. A polyimide silicone resin composition comprising from 50% by mass to 99% by mass of the polyimide silicone resin according to claim 1 or 2 and from 1% by mass to 50% by mass of an epoxy compound.

12. The composition according to claim 11, which further comprises a catalyst which accelerates the reaction of the epoxy compound.

13. A method comprising adhering or coating a substrate with a polyimide silicone resin composition according to claim 11 as an adhesive or coating material.

14. A product obtained by the method of claim 13.

* * * * *